United States Patent [19]
Kamiwada et al.

[11] Patent Number: 6,049,795
[45] Date of Patent: Apr. 11, 2000

[54] APPLICATION PROGRAM STARTING METHOD, RECORDING MEDIUM ON WHICH SAID COMPUTER PROGRAM IS RECORDED, AND COMPUTER SYSTEM

[75] Inventors: Toru Kamiwada; Takushi Fujita, both of Kawasaki, Japan

[73] Assignee: Fujitsu Limited, Kawasaki, Japan

[21] Appl. No.: 08/974,246

[22] Filed: Nov. 19, 1997

[30] Foreign Application Priority Data

Jun. 27, 1997 [JP] Japan ..................................... 9-172659

[51] Int. Cl.[7] ....................................................... G06F 17/30
[52] U.S. Cl. .......................... 707/1; 707/3; 707/4; 707/5; 707/10; 707/103; 707/104; 395/703; 395/704; 395/705; 395/706; 395/707; 395/708; 395/709; 395/710; 395/711; 395/12
[58] Field of Search ................................... 707/1, 3, 4, 5, 707/10, 103, 104; 704/256; 708/201, 504; 455/302, 456; 395/703, 704, 705, 706, 707, 708, 709, 710, 711, 712

[56] References Cited

U.S. PATENT DOCUMENTS

| | | | |
|---|---|---|---|
| 5,717,914 | 2/1998 | Husick | 707/5 |
| 5,742,816 | 4/1998 | Barr | 707/104 |
| 5,777,612 | 7/1998 | Kataoka | 708/504 |
| 5,854,923 | 12/1998 | Dockter | 707/5 |
| 5,880,979 | 3/1999 | Mennemeier | 708/201 |
| 5,889,999 | 3/1999 | Breternitz | 395/709 |

*Primary Examiner*—Thomas G. Black
*Assistant Examiner*—Diane D. Mizrahi
*Attorney, Agent, or Firm*—Staas & Halsey LLP

[57] ABSTRACT

The computer system is provided with a prediction part 21 for calculating the probability of the respective contents being designated based on the operation of an input device 25, an object list 24 for storing a plurality of contents in the order of the high probability of designation according to said calculation results, an execution control part 22 for starting an application program 26 for processing each of the predetermined number of contents stored on its top side, and a display/reproducing part 23 for carrying out preparation for processing of the contents by the started application program 26. In case of the hyper text processing, concretely the processing to display the character strings, still images, and moving pictures which are the contents thereof on the display screen or to reproduce the voice, the time before the user can actually see or hear the contents can be reduced.

21 Claims, 10 Drawing Sheets

FIG. 10

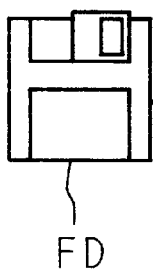

FD

| STEP OF CALCULATING THE PROBABILITY OF THE RESPECTIVE CONTENTS BEING DESIGNATED BASED ON THE OPERATION OF THE INPUT DEVICE |
|---|
| STEP OF ARRAYING THE PLURAL CONTENTS ON THE LIST IN THE ORDER OF THE HIGH PROBABILITY OF DESIGNATION ACCORDING TO THE RESULTS OF THE CALCULATION |
| STEP OF EXAMINING THE OPERATING CONDITION OF THE INPUT DEVICE |
| STEP OF OBTAINING THE MOVING DISTANCE AND THE MOVING DIRECTION OF THE POSITION DESIGNATED BY THE INPUT DEVICE BASED ON THE RESULTS OF THE EXAMINATION IN THE OPERATING CONDITION OF THE INPUT DEVICE |
| STEP OF OBTAINING THE POSITION DESIGNATED BY THE INPUT DEVICE AND THE MOVING VELOCITY IN THE LOGICAL SPACE |
| STEP OF RE-CALCULATING THE PROBABILITY OF THE RESPECTIVE CONTENTS BEING DESIGNATED IN CASE OF A CHANGE IN THE DESIGNATED POSITION BY THE INPUT DEVICE |
| STEP OF RE-ARRANGING THE PLURAL CONTENTS ON THE LIST IN THE ORDER OF THE HIGH PROBABILITY OF DESIGNATION ACCORDING TO THE RESULTS OF THE CALCULATION |
| STEP OF PREPARING PROCESSING BY STARTING THE APPLICATION PROGRAM FOR PROCESSING THE RESPECTIVE ONE OF THE PREDETERMINED NUMBER OF CONTENTS ARRAYED ON THE TOP SIDE OF THE LIST |

# APPLICATION PROGRAM STARTING METHOD, RECORDING MEDIUM ON WHICH SAID COMPUTER PROGRAM IS RECORDED, AND COMPUTER SYSTEM

BACKGROUND OF THE INVENTION

FIELD OF THE INVENTION

The present invention relates to a method for starting an application program. More particularly, the invention relates to a method for starting an application program by processing multimedia contents selected on a display screen. The selected contents are processed with an application program corresponding thereto for display on a display screen as images and for reproduction as sound from a speaker. The invention relates also to a recording medium on which a computer program carrying such method as software is recorded and a computer system to be operated thereby.

DESCRIPTION OF RELATED ART

In consequence of the recent improvement in computer systems, especially personal computers, into multimedia compatible type for the purpose of applying them to personal use, utilization of a so-called multimedia title has become popular. Such a title carries multiple types of electronic information including still images, moving picture, voice, etc. in a sheet of CD-ROM. Such electronic information is in general described in a program language which is so-called HTML (Hyper Text Markup Language). Hyper Text is a text which is mutually associated by a link, with which plural texts can be successively approached, namely browsing can be performed.

Further, due to the propagation of Intern in recent years, it has become possible to have access to various kinds of electronic information stored in the data bases and terminal devices throughout the world and browse them with the user's own terminal device.

A multimedia tile as described above or the contents of Hyper Text from the Internet can be disposed in dispersion in an imaginary three dimensional space and browsed therein. For such browsing it is necessary for the user to give an explicit designation such as to click the portion showing clearly the symbolic image representing the contents with which the user desires to have access next (e.g., icon) or the linking part with other contents (e.g., the portion marked up on the contents) on a background screen showing such three-dimensional space. And, according to the explicit designation by the user, an application program corresponding to the designated contents is started by the control program (Hyper Text browsing program) and is instructed so that the data of said contents are browsed to make it possible for the user to see or hear the contents in practice.

When an explicit instruction has been made by the user in starting the application program by the conventional control program, an application program necessary at that point is started and the processing of the contents designation by the user is started. It is to be noted in this case that for a multimedia title various application programs are required. These include an application program for displaying character codes, an application program for displaying still images, an application program for displaying moving pictures, and an application program for reproducing voice. For the Internet, even for application program for displaying for example a still image, the respective application program may be required to meet the format in use such as JPEG, GIF, TIFF, and the like.

Accordingly, in case of the hyper text processing (concretely, the processing to display character strings, still images, and moving pictures which are the contents thereof on the display screen or to reproduce voice,) the application program corresponding to the respective contents is started by the control program only on receipt of the explicit designation by the user. For this reason, when the user explicitly indicates the contents desired to be seen next, the corresponding application program starts at that point, and reads the data of the contents designated by the user to start processing. For this reason, there have been cases where a considerable length of time has been required before the user can actually see or hear the contents after the user explicitly designated them.

BRIEF SUMMARY OF THE INVENTION

The present invention has been made in the light of the above situation, and its object is to provide: a method for starting an application program with settlement of the problems as above by previously starting the corresponding application program or providing a condition immediately before the condition where display on the display screen is possible, or by predicting the possibility of the individual hypertext being designated explicitly next by the user; a recording medium recording said computer program; and a computer system.

The method of starting an application program according to the present invention is an application program starting method wherein, when any one of the plural pieces of information disposed in a logical space is designated by an operation of an input device, an application program for processing the information is started to output the contents of the information. The method comprises steps of: checking the operating condition of the input device; calculating the probability for the respective pieces of information to be designated in the next operation based on the data indicating the operating condition of the input device; arraying a plurality of the pieces of information in the order of the high probability of being designated next according to the results of the calculation; and carrying out the preparation for processing by previously starting the application program for processing the predetermined number of pieces of information arrayed on the top side of the probability order.

According to such an application program starting method of the present invention, the probabilities of designation for the respective ones of the plural pieces of information are calculated based on the operating condition of the input device, and according to the results of the calculation, the plural kinds of information are arrayed in the order of higher probability of being designated next, by which the application program for processing the predetermined number of pieces of information which are arrayed on the top side in the order of probability is started in advance and preparation for processing is made.

Also, the application program starting method of the present invention as above is characterized in that, in the step of carrying out the preparation for processing, series of information arrayed in the order of the probability are divided into plural groups according to the probability level, and the progress of preparation for the application programs for processing the information of the respective groups are differentiated by group.

According to the application program starting method as above, series of the information arrayed in the order of probability are divided into plural groups, thereby differentiating by group the progress of preparation of the application programs for processing the information of respective groups.

Furthermore, the application program starting method of the present invention is characterized in that the information in which the probability obtained as the calculation results by the step of calculating the probability is not lower than the predetermined level is arrayed in a list form as the information for processing preparation information to be stored, and the information in which the calculated probability has become the predetermined level or lower is deleted from the list.

According to the application program starting method of the present invention as above, the information in which the probability obtained by the step of calculating the probability is not lower than the predetermined level is arrayed in a list form as the information for processing preparation and stored, and the information in which the probability calculation result is not higher than the predetermined level is deleted from the list, and the hardware resources are saved.

Furthermore, the application program starting method of the present invention is characterized in that, in the step for calculating the probability, with respect to the information whose existence position in the logical space is defined by a link relation with the another information, the calculation of the probability is carried out on the basis of the position on which the link is defined in the information of the link source.

According to the application program starting method of the present invention as above, with respect to the information wherein the position of existence in the logical space is defined by the link relation with another piece of information, the probability calculation is carried out on the basis of the position in which the link is defined in the information of the link source.

Furthermore, the application program starting method according to the present invention is characterized in that, in the step for calculating a probability, calculation is made so that: the probability becomes higher as the distance between the position designated by the input device in the logical space and the logical position of the individual information decreases; with respect to the information whose existence position in the logical space is defined by the link relation with another piece of information, the probability becomes the lower as the number of links from the information of the link source increases; the probability becomes the higher as the angle between the moving direction of the position designated by the input device in the logical space and the logical position of the individual information decreases; and the probability becomes higher even when the angles are the same, as the moving velocity of the position designated by the input device in the logical space increases, respectively.

According to the application program starting method of the present invention as above, the probability is calculated in the step of calculating the above probability and the step of recalculating the same: according to the distance between the position designated by the input device in the logical space and the logical position of the individual information; with respect to the information wherein the existence position in the logical space is defined by the link relation with another piece of information, according to the number of links from the link source; according to the angle between the moving direction of the position designated by the input device in the logical space and the logical position of the individual information; and the moving velocity of the position designated by the input device in the logical space, respectively.

The computer system of the present invention is characterized in that, in a computer system which is so designed that a plurality of information contents which are respectively processed by any of the plural kinds of application programs are displayed on a display as the symbolic diagram images representing the contents, and when any of them is designated by an operation of an input device, the application program for processing the contents corresponding to the symbolic diagram images is started to output and display the contents on the display, comprising: probability calculating means for calculating the probability of the respective symbolic diagram images being designated based on the operating condition of the input device; storing means for storing the contents designation information for designating the contents with which the plural symbolic diagram images are associated in the higher order of the high probability of designation according to the calculation result obtained by the probability calculating means; controlling means for starting the application program for processing the respective one of the predetermined number of contents designation information stored on the top side of the storing means; and means for carrying out the preparation for processing the contents by the application program started by the controlling means.

According to the computer system of the present invention as above, the probability calculating means calculates the probability of designation concerning the respective symbolic diagram images based on the operating condition of the input device, the storing means stores the contents designation information corresponding to the plural symbolic diagram images in the order of the high probability of designation according to the calculation results, the controlling means starts the application program for processing the respective one of the contents designated by the predetermined number of contents designation information stored on the top side of the storing means, and preparation for processing of the contents is made by the started application program.

Also, the computer system according to the present invention is characterized in that, the means for carrying out the preparation for processing divides the plural pieces of the contents designation information into the plural groups according to the level of the probability order and controls so that the progress of the preparation for processing the contents designated by the contents designation information of the respective groups by the application program are to be differentiated.

According to the computer system of the present invention as above, plural kinds of the contents designation information are divided into the plural groups according to the level of the probability order and controlled so that the progress of the preparation by the application program for processing the contents designated by the contents designation information of the respective groups are to be differentiated by the means for carrying out the preparation for processing.

Furthermore, the computer system according to the present invention is characterized in that the storing means deletes the contents designation information corresponding to the symbolic diagram images in which the probability obtained as the results of calculation by the probability calculating means has been lowered to the predetermined level or lower.

According to the computer system of the present invention as above, because the contents designation information corresponding to the symbolic diagram images in which the probability obtained as the results of calculation by the probability calculating means is lowered to the predetermined level or lower is to be deleted, the hardware resources are saved.

The computer readable recording medium of the present invention is a recording medium which is so designed that a plurality of the information contents to be respectively processed by any of the plural kinds of application programs and have a link relation at least partially and are dispersed in a logical space are displayed on the display as symbolic diagram images representing the contents, and when any of them is designated by the operation of the input device, the application program for processing the contents corresponding to the symbolic diagram images is started to output and display the contents, the computer readable program code means comprising: computer readable program code means for causing the computer to examine the operating condition of the input device; computer readable program code means for causing the computer to calculate the probability of the respective symbolic diagram images having designated based on the operating condition of the input device; computer readable program code means for causing the computer to array the contents designation information for designating the contents with which the plural symbolic diagram images are associated in the order of the high probability of designation on the list; computer readable program code means for causing the computer to obtain the moving distance and the moving direction of the position designated by the input device based on the operating condition of the input device; computer readable program code means for causing the computer to obtain the position designated by the input device and the moving velocity in the logical; computer readable program code means for causing the computer to re-calculate the probability of the respective symbolic diagram images being designated in case of a change in the designated position by the input device; computer readable program code means for causing the computer to re-array the contents designation information corresponding to the plural symbolic diagram images on the list in the order of the high probability of designation according to the results of calculation; and computer readable program code means for causing the computer to prepare the processing by starting the application program for processing the respective one of the predetermined number of contents designation information arrayed on the top side of the list.

When such a recording medium of the present invention is installed in the computer system, the operating condition of the input device is checked, the probability of the respective symbolic diagram images being designated are calculated based on the operating condition of the input device, the contents designation information associated with the plural symbolic diagram images is arrayed on the list in the order of the probability of designation according to said calculation results, the moving distance and the moving direction of the position designated by the input device are obtained based on the results of examining the operating condition of the input device, and the position designated position designated by the input device in the logical space and the moving velocity are obtained. Then, in case of a change in the position designated by the input device, the probability of the respective symbolic diagram images being designated are recalculated, and the contents designation information corresponding to the plural symbolic diagram images are re-arrayed on the list in order of the probability of designation according to the results of said calculation, and the application program for processing the respective one of the predetermined number of contents designation information arrayed on the top side of the list is stored to carry out the preparation for processing.

The computer readable recording medium of the present invention is characterized in that, in the computer readable program code means for causing the computer to prepare the processing, a plurality of contents designation information contained in the list are divided into a plurality of groups according to the level of the probability, thereby accelerating the degree of progress of preparation for processing by the application program designation information in the group having high level of probability.

When the recording medium of the present invention as above is installed in a computer system, the plural pieces of contents designation information contained in the list are divided into the plural groups according to the levels of the probability order, and the preparation for processing is made in advance in the above preparation step so that the progress of preparation by the application program for processing the contents designated by the contents designation information in the group having high level of probability is accelerated stepwise according to the designated probability.

The above and further objects and features of the invention will more fully be apparent from the following detailed description with accompanying drawings.

BRIEF DESCRIPTION OF THE SEVERAL VIEWS OF THE DRAWINGS

FIG. 10 is a schematic view showing the contents of the computer program recorded on the recording medium of the present invention.

DESCRIPTION OF THE PREFERRED EMBODIMENTS

Hereinafter, the present invention is described in is detail based on the drawings which show the embodiments thereof.

Figure 1:
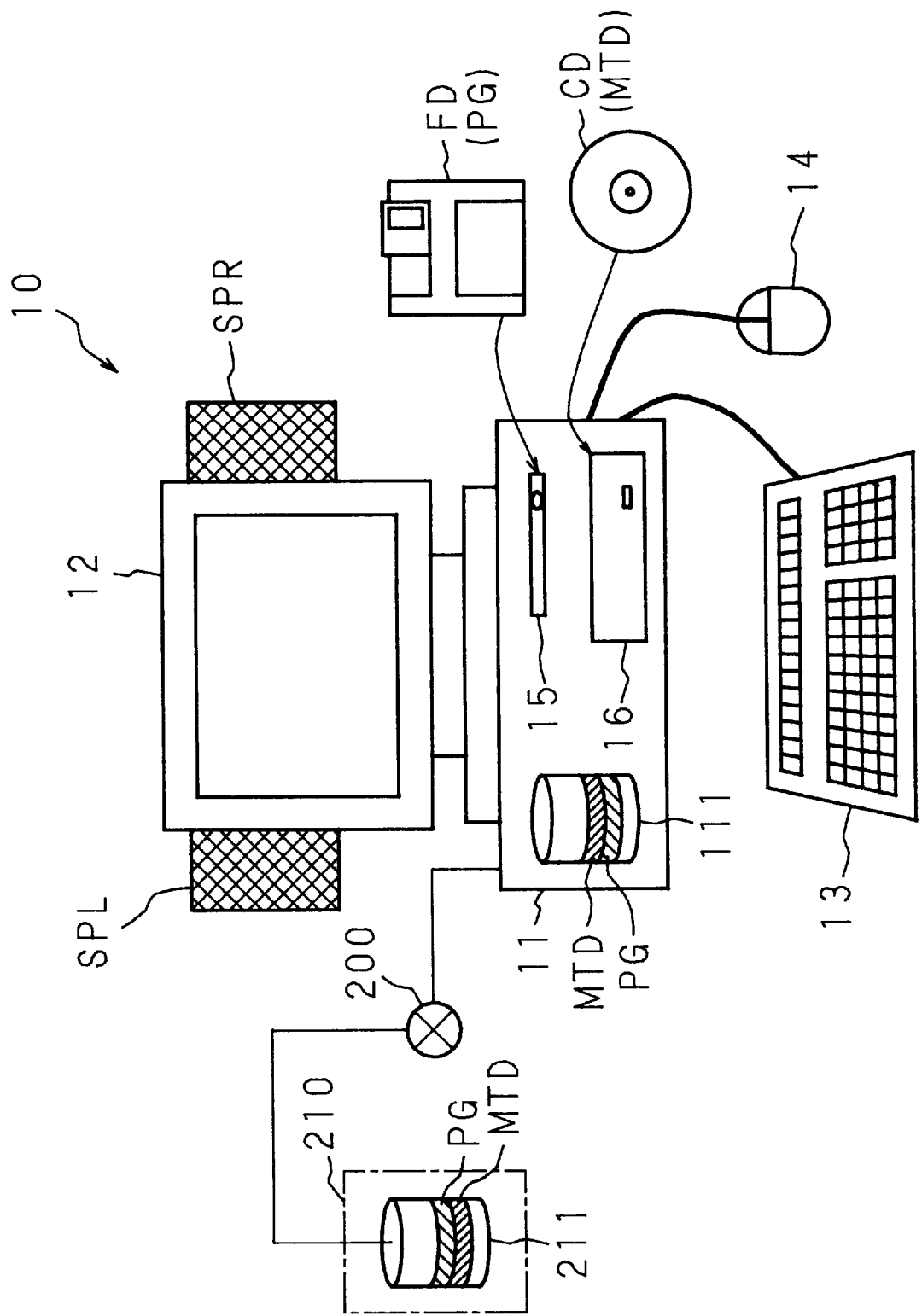
FIG. 1 is a schematic diagram showing an example of the schematic appearance view of the personal computer as a computer system of the present invention.

FIG. 1, shows is an example of a schematic view of a personal computer as a computer system of the present invention. In FIG. 1, the personal computer 10 is constituted by a body 11 containing CPU, ROM, RAM, hard disk drive (HDD), and the like, a display device 12 such as a CRT display, a keyboard 13, a mouse 14, right and left speakers SPL, SPR, etc.

The body 11 contains a flexible disk drive 15 which is a reading device for a flexible disk FD as a recording medium in which a hyper text browsing program PG as a computer program is recorded. The body 11 also contains a CD-ROM drive 16 which is a CD-ROM CD reading device utilizing a compact disk in which is recorded the multimedia title data MTD to be processed by said computer program.

In this example, the hyper text browsing program PG is recorded on the FD, and the multimedia title data MTD are recorded on the CD-ROM CD, but this is a mere exemplification, and both items may be recorded on the CD-ROM CD, or either one or both may be recorded on a hard disk drive (HDD) 111.

Furthermore, as shown in FIG. 1, in case a personal computer 10 is connected with for example the server 211 of the computer communication service provider 210 through a line 200, the hyper text browsing program PG and the multimedia tittle data MTD may be recorded on said server 211, so that they are read by the personal computer 10 through the line 200 and stored in HDD 111. As shown in FIG. 1, when the personal computer 10 is connected with the computer communication service provider 210, further connection with the Internet is of course feasible, in which case it is possible to browse the Internet contents in place of the data of the multimedia title.

Figure 2:
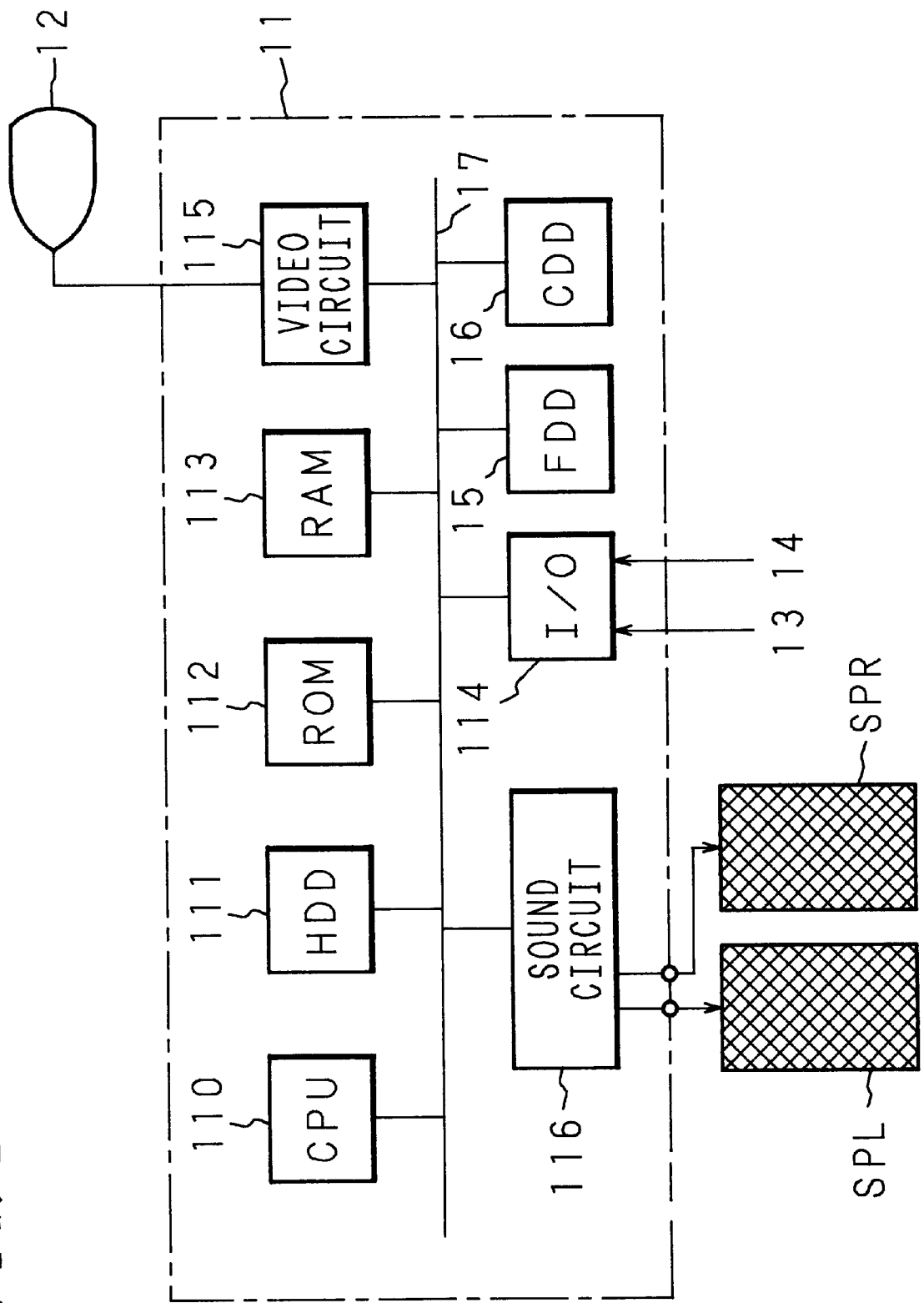
FIG. 2 is a block diagram showing an example of the hardware constitution of the computer system of the present invention.

FIG. 2 is a block diagram showing an example of hardware constitution of the body 11 of the personal computer 10 as shown in FIG. 1 above. In the body 11 contained are the CPU 110, HDD 111, ROM 112, RAM 113, flexible disk drive (FDD) 15, and CD-ROM drive (CDD) 16, and in addition, a video circuit 115 for display control of the display device 12, an interface circuit (I/O) 114 for the keyboard 13 and the mouse 14, sound circuit 116 for reproducing the audible sound with the left and right speakers SPL, SPR, etc., and they are mutually connected by a bus 17.

Figure 3:
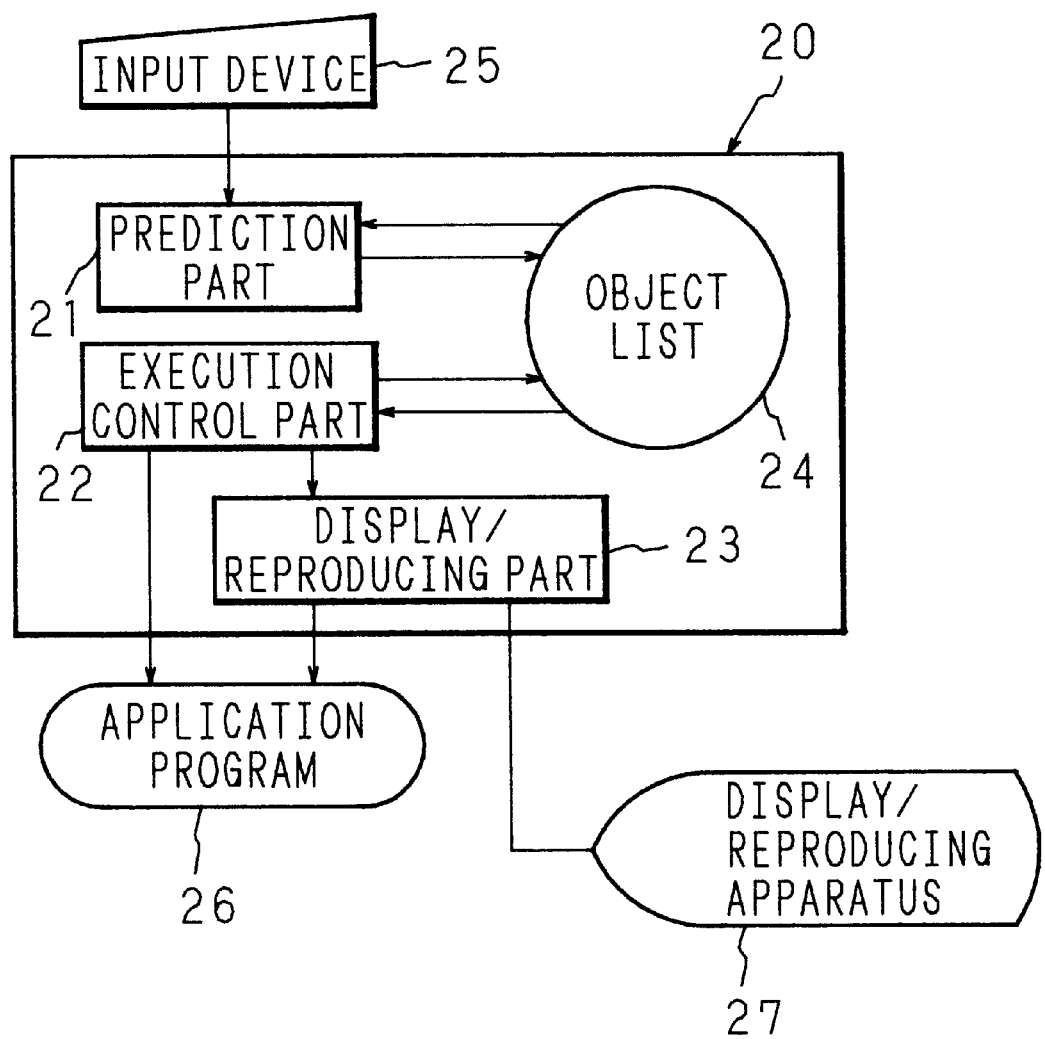
FIG. 3 is a schematic view for illustrating the function of a computer program recorded on the recording medium of the present invention.

FIG. 3 is a schematic view for illustrating the function of the hyper text browsing program (hereinafter to be called a browsing program) recorded on the flexible disk FD as a computer program recording medium. The browsing program may be recorded on the CD-ROM CD as described above, or it may be recorded in advance in HDD 111, or may be obtained for example by computer communication from the server 211 of the computer communication service provider 210 through the communication line 200.

In FIG. 3, a browsing program 20 includes the functions of a prediction part 21, an execution control part 22, a display/reproducing part 23, and an object list 24. The input device 25 is a device such as the keyboard 13 and the mouse 14 as shown in FIG. 1. When the input device 25 is operated by the user, the said operation is detected by the prediction part 21. The display/reproducing device 27 includes the CRT display 12, and the right and left speakers SPL, SPR as shown in FIG. 1, by which the display of image data such as characters, still images, moving pictures, etc. and reproduction of sound data are made by the display/reproducing part 23. The application program 26 (data of multimedia title), in concrete terms, is the one recorded on a CD-ROM CD to be inserted in the CDD 16 as shown in FIG. 1, or the one stored in the HDD 111 of personal computer 10 in advance, or further may be obtained for example from the server 211 of the computer communication service provider 210 through the communication line 200.

The predicting part 21 has concretely an operation function to be executed by the CPU 110, which functions as the means for calculating the probability. The predicting part 21 carries out prediction processing as described later based on the results of an operation of the input device 25 by the user, when the operation is carried out. Predicting part 21 also changes the contents of the object list 24, concretely the array of the objects, according to said prediction results.

The object list 24 is the data stored in the memory device which functions as the storing means such as the RAM 113 or HDD 111. The execution control part 22 has concretely the function for controlling various application programs by the CPU 110, and functions as the controlling means. The execution controlling part 22 starts the application program 26 according to the contents of the object list 24, 25 as a result, execution controlling part 22 causes the data given to the display/reproducing part 23 from the application program 26 to be displayed on the display/reproducing device 27.

Figure 4:
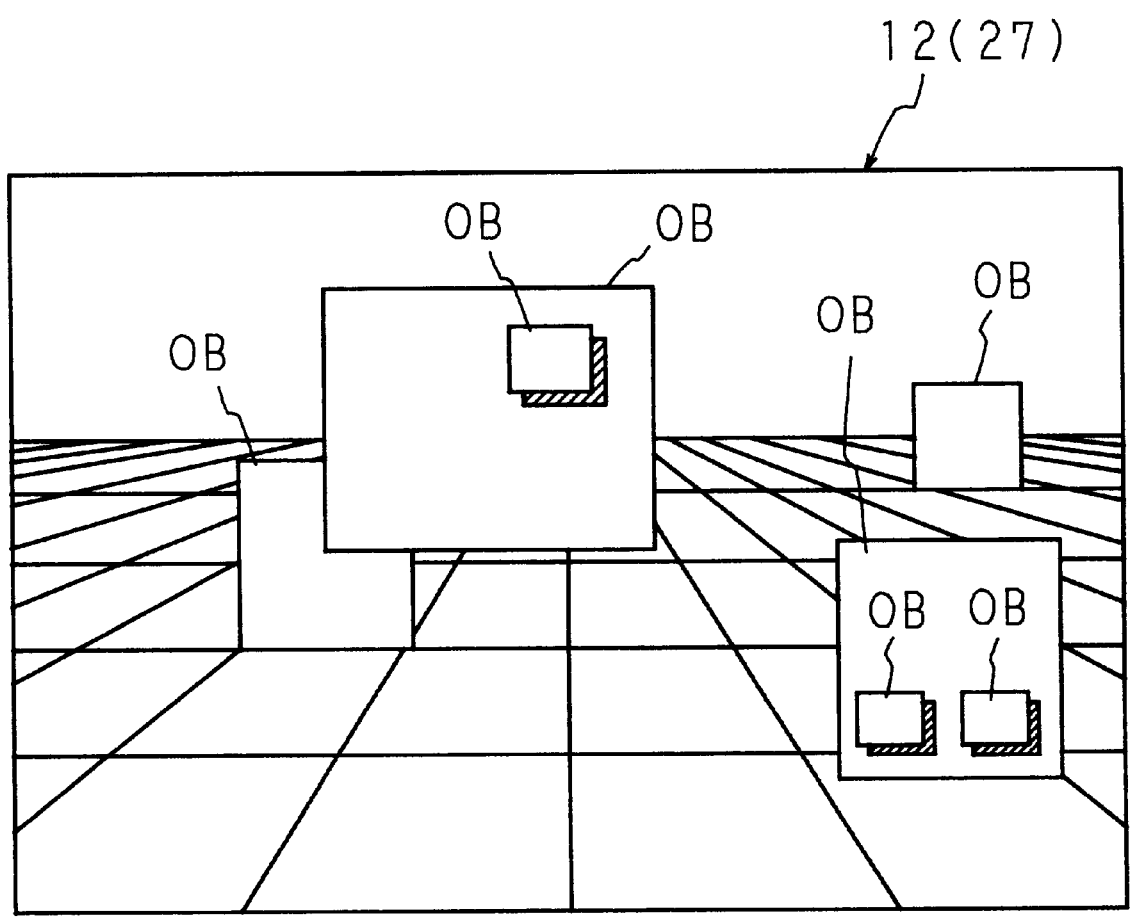
FIG. 4 is a schematic view showing the display condition of the display/reproducing apparatus caused by the computer program recorded on the recording medium of the present invention.

FIG. 4 is a schematic view showing the display condition of a main program executed by the personal computer 10, concretely the display condition of the display/reproducing device 27 on the CRT display 12 by the hyper text browsing program 20.

The display screen by the hyper text browsing program 20 has an appearance where various kinds of contents are disposed as symbolic diagram images, e.g., as an object OB in the form of icon, in a three dimensional space. The user browses each content while moving in this three-dimensional space. The data for display of each content is previously recorded in the CD-ROM CD which is set in the CDD 16.

Figure 5:
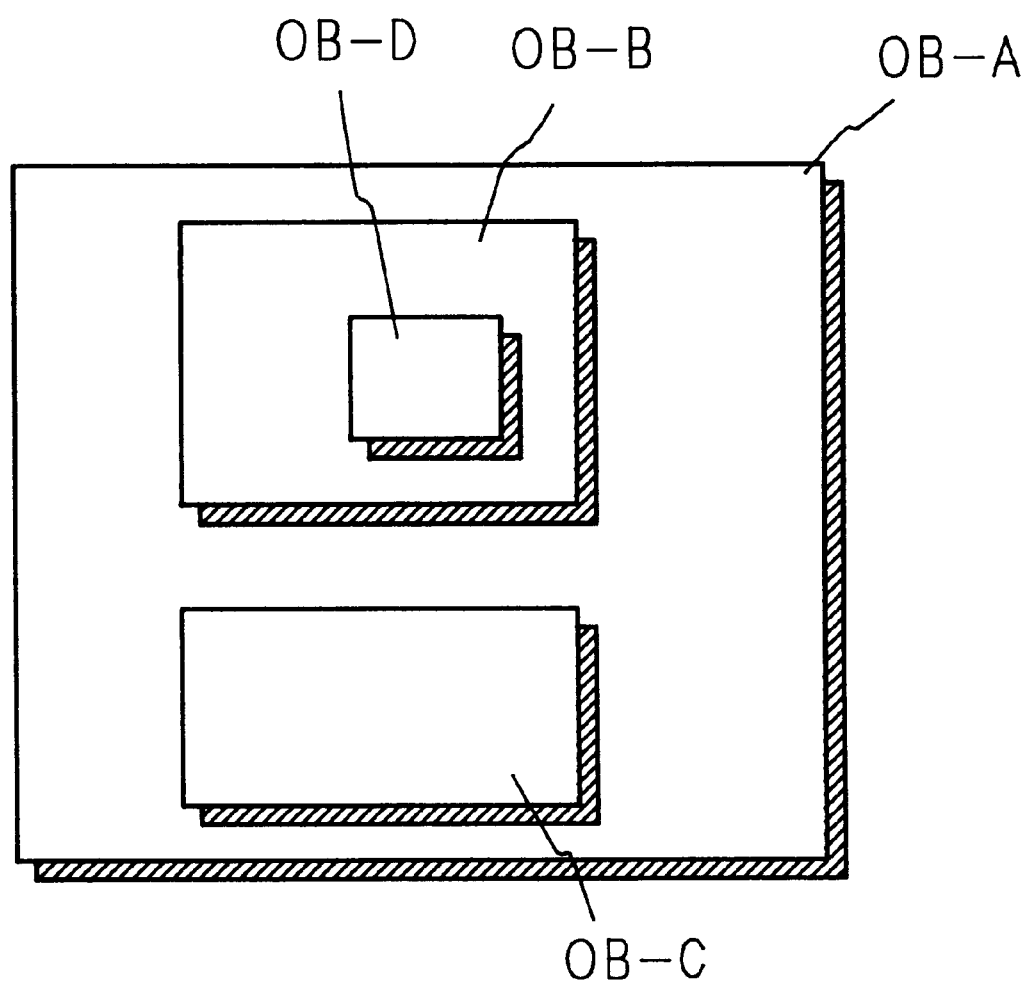
FIG. 5 is a schematic view showing the constitution of the hyper link structure of the object to be processed by the computer program recorded on the recording medium of the present invention.

In this browsing program 20, each content is disposed as and object OB expressed as an icon positioned in the three-dimensional space as shown in FIG. 4. Gathering of the objects subjected to control by the browsing program 20 is held as the object list 24. Also, each object is related by a hyper link structure. As shown in the schematic view of FIG. 5, the object positioned at the end of the link is displayed small in an overlaid state on the object positioned at the root of the link. Concretely, in FIG. 5, the object OB-A is linked with the objects OB-B and OB-C, and further, the object OB-B is linked with the object OB-D. Accordingly, when viewed from the object OB-A, the objects OB-B and OB-C exist at the farther end of tracing a single link. When viewed from the object OB-B, the object OB-D exists at the farther end of tracing a single link. When viewed from the object OB-A, the object OB-D exists at the farther end of tracing two links.

The user of this browsing program 20 is expressed as an object (camera) having the user's viewpoint in position and direction within the same space. And, this camera moves in the three-dimensional space as shown in FIG. 4, as expressed by the browsing program 20, to change its position by the operation of the input device 25 by the user.

The procedures of the present invention to be executed by the hyper text browsing program 20 are explained below. This hyper text browsing program 20 is in general operated by being read by the FDD 15 from the flexible disk FD, or read by the CDD 16 from the CD-ROM CD and stored on the HDD 111 or the RAM 113. Alternatively, the constitution may be such that the hyper text browsing program 20 is previously stored in the ROM 112.

In the browsing program 20, briefly, the prediction part 21 carries out prediction for the individual objects about the likelihood for the respective ones to be next executed.

Namely, predicting part 21 predicts the likelihood for the execution to be explicitly instructed by the user. According to the results thereof, each object is set in order and registered on the object list 24. Accordingly, an explanation is given first about the prediction by the prediction part 21 and the registration of the object on the object list 24 according to the result. Thereafter the whole operation procedures will be explained.

Figure 6:
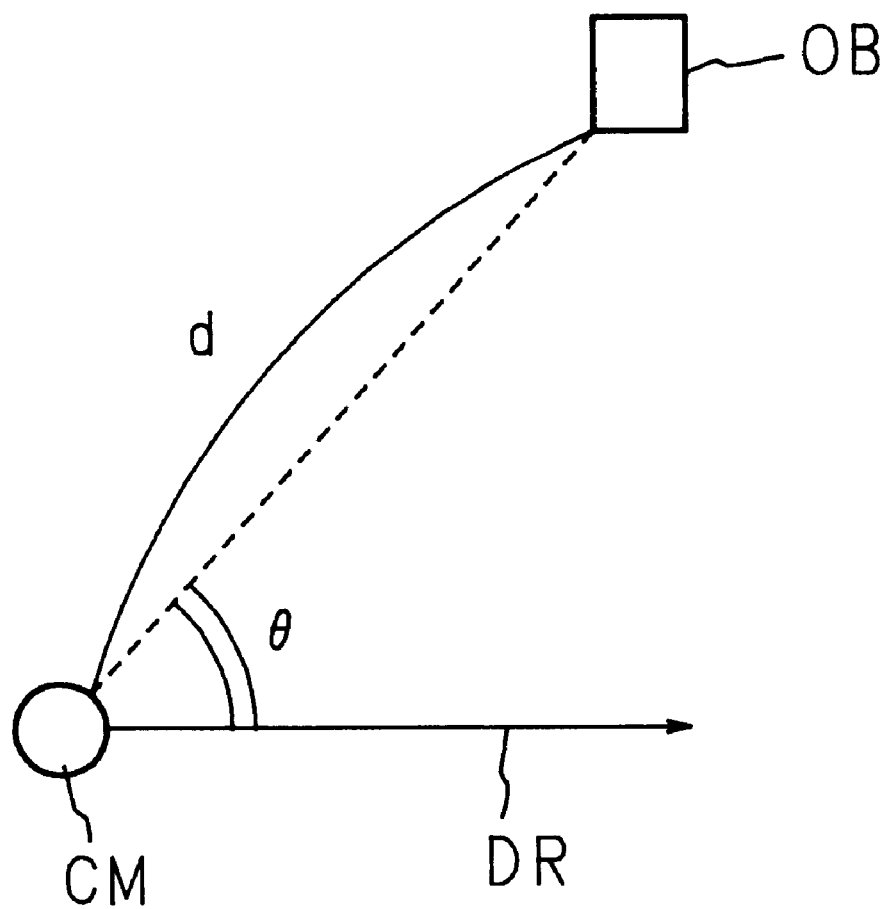
FIG. 6 is a schematic view showing the principle of the probability calculation by the application program starting method of the present invention.

When the amount of change of the camera position is regarded as a velocity, the absolute value v of the velocity is obtainable from said velocity vector. The schematic view of FIG. 6, shows the principle of the probability calculation by the application program starting method of the present invention. The distance d from the camera CM and the angle θ from the advance direction DR of the camera CM are obtained with respect to each object OB. With the above velocity v of camera CM, the distance d between the camera CM and the object OB, and with respect to the angle θ between the advance direction DR of the camera CM and the direction to the object OB, the converted distance p between the camera CM and each object OB is obtained by using the constants a and b, according to the following equation (1).

$$p=(1/v+a)\times(\theta+b)\times d \quad (1)$$

An object in which the converted distance p obtained by the equation (1) is a minimum is taken as the reference object in the three-dimensional space at the time. Other objects are all controlled on the basis of the relative positional relations with said reference object. In Equation (1), the larger the velocity v of the camera CM is, or the smaller the distance d between the camera CM and the object OB is, or the smaller the angle θ between the advance direction DR of the camera CM and the direction to the object OB is, the smaller q priority value q becomes.

When the reference object is determined in the above manner, the necessary link number n for reaching from the reference object is obtained with respect to each of other objects. And, as shown in the following equation (2), with respect to the respective objects, the value obtained by multiplying the converted distance p obtained in the equation (1) by a constant c n (the above link number) times is set to be the priority q.

$$q=p\times c^n \quad (2)$$

The smaller is the priority value q obtained as above, the higher the possibility is for the said object to be read next by the user at that time, namely, the possibility to be designated next explicitly. Thus, in order to make preparation for such display preferentially, the objects are arrayed in order of the small priority value q and registered on the object list 24.

Figure 7:
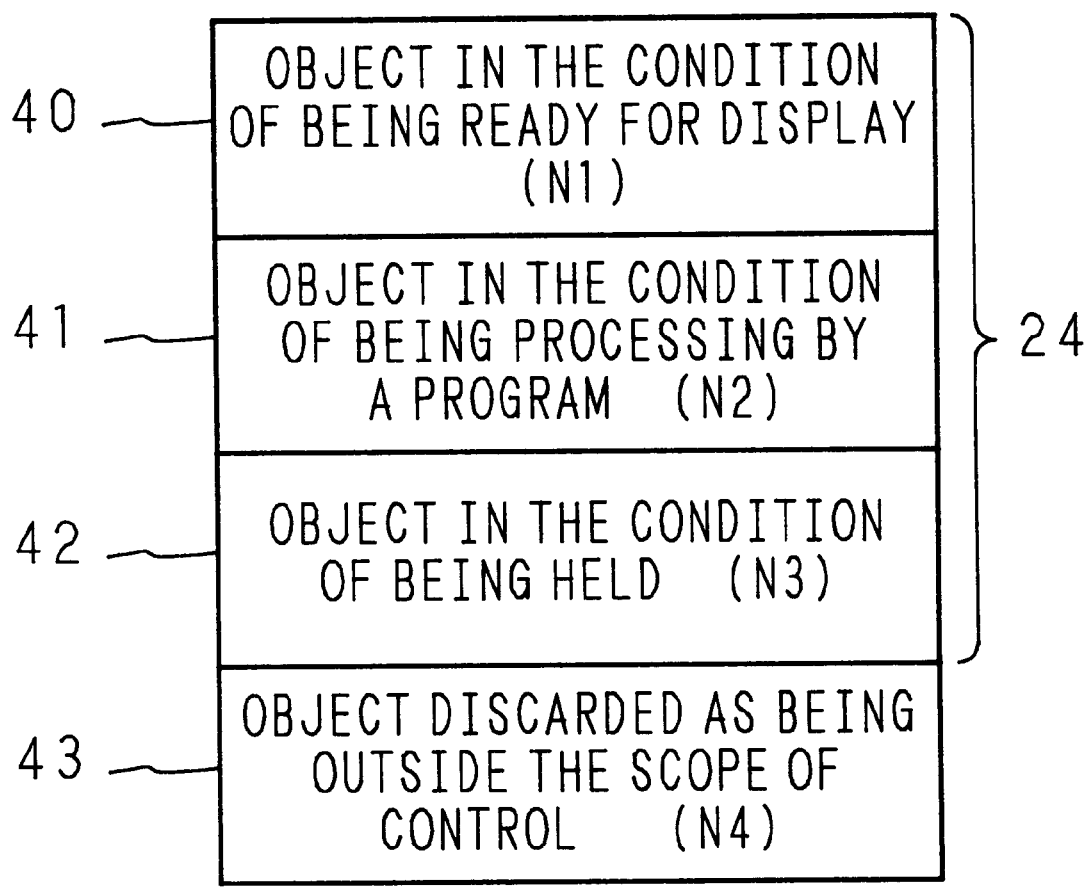
FIG. 7 is a schematic view showing the contents of registration of the object list of the computer system of the present invention.

FIG. 7 is a schematic view showing the condition of the objects registered in the object list 24. A predetermined number (N1) of the registered objects from the top side of the object list 24 are in the first priority object group 40. The contents of object group 40 are to be browsed in advance and the necessary application program is to be started to prepare the data for display.

A predetermined number (N2) of the objects having slightly greater priority values q than the first priority object group 40 are in the second priority object group 41. The contents of object group 41 are to be browsed in advance to start the necessary application program.

Furthermore, with respect to this first order object group 40 and second order object group 41, the corresponding application programs are used as described above to make preparation up to the necessary stages respectively beforehand. When the program for processing said contents recognizes the existence of a new hyper link, if there is any among the contents with which said link is made that has not yet been registered in the object list 24, it is additionally registered in the object list 24.

In addition to the first priority object group 40 and second priority object group 41, a predetermined number (N3) of objects are in the third order object group 42 which is to be held for the next prediction calculation. The other objects are in the object group 43 to be excluded from the object list 24 and set outside the scope of control. Accordingly, the objects totaling N1 of the first order object group 40, N2 of the second order object group 41, and N3 of the third order object group 42 are to be the capacity of the object list 24. Also, as described above, by excluding the object group 43 which is outside the scope of control from the subject of control, a saving of the system resources can be expected.

Figure 8:
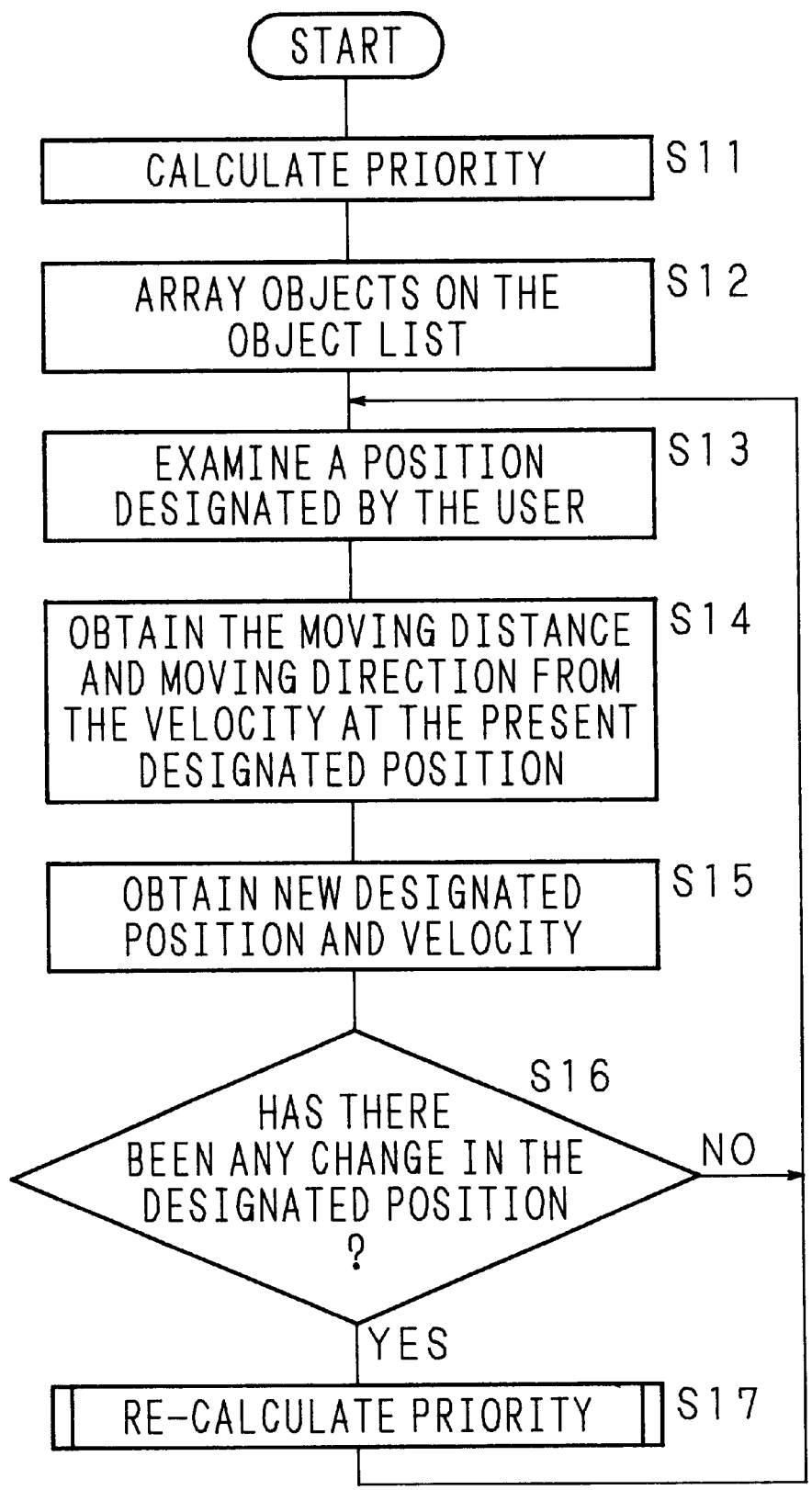
FIG. 8 is a flow chart showing the execution procedures for the starting method of the application program of the present invention.

The prediction part 21 of the browsing program 20 is to obtain the priority value q for registering each object in the object list 24 in the above manner. Hereinafter, the procedures of a method of the present invention to be executed by the browsing program 20 are explained with reference to the flow charts of FIG. 8 and FIG. 9.

In the first place, when the hyper text browsing program 20 is started, based on the designated position (position of the camera as an object) corresponding to the operating condition of the input device 25 at that point the priority of each object; after "q" insert more concretely the priority value q is calculated by the prediction part 21 (step S11). According to the results thereof the objects are arrayed on the object list 24 (step S12). Thereafter, the actual processing by the hyper text browsing program 20 is commenced.

When the actual processing by the hyper text browsing program 20 is started, the designated position by the input by the user, i.e., by the operation of the input device 25 by the user, is periodically examined (Step S13). Concretely, the operating condition of the input device 25 by the user is examined by the prediction part 21, and the moving distance and the moving velocity are obtained from the velocity at the present designated position (velocity of the camera as an object) (step S14). From the results of this operation the user's new or present position and velocity are obtained (step S15), and according to said results examination is made as to whether the position designated by the user has changed or not (step S16).

In case of no change in the position designated by the user ("NO" in Step S16), the processing is returned to the step S13. In case of a change in the user's position ("YES" in Step S16), the re-calculation of priority is made in the prediction part 21 (step S17).

Figure 9:
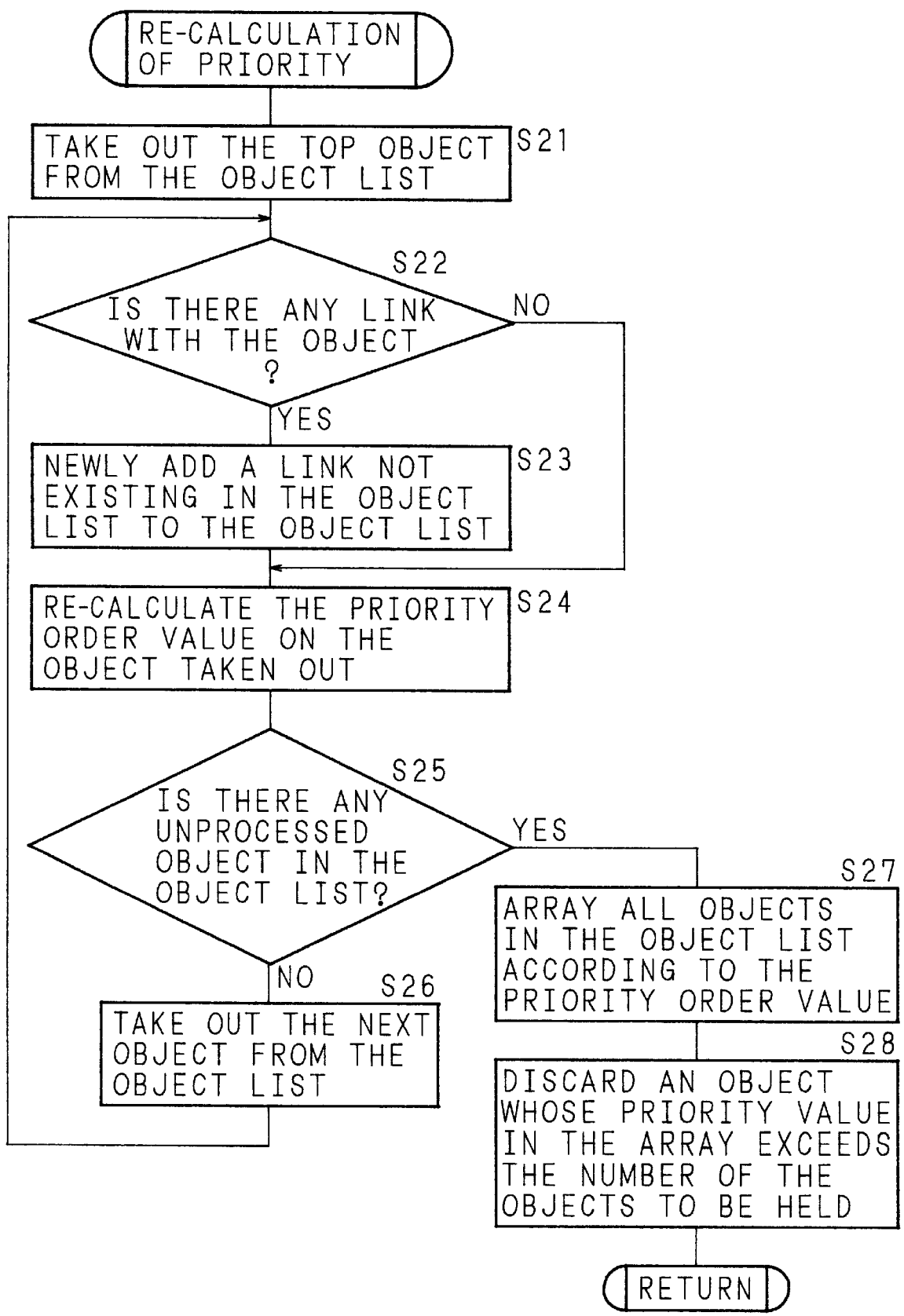
FIG. 9 is a flow chart showing the execution procedures for the application program starting method of the present invention.

FIG. 9 is a flow chart showing the procedures for re-calculation of the priority of the step S15. First, the prediction part 21 takes out the top object of the objects registered in the object list 24, i.e., the object whose priority value q is the minimum (step S21) and checks whether said object has a link with other objects (contents) or not (step S22).

When the object whose priority value q is the minimum taken out in the step S21 has no link with other objects ("NO" in Step S22), the process is advanced to the step S23. On the other hand, when the object whose priority value q is the minimum taken out in the step S21 has link with other objects ("YES" in Step S22), if there is among them a link that has not yet been registered in the object list 24 till then, the object with which the link is made is registered in the object group of the third priority 42 (step S23), and the process thereafter is advanced to the step S24.

In the step S24, with respect to the object whose priority value q is the minimum taken out in the step S21, the priority value q is calculated again in the manner as described above. And, in the next step S25, check is made as to whether the processing as above was made with respect to all the objects in the object list 24 or not, and the processes from the step S22 to the step S24 are repeated until the processing with all objects is completed (step S26). In this case, the object registered in the object list 24 newly as the object group 42 of the third priority in the preceding step S23 is also to be processed.

When the processes from the step S22 to the step S24 are completed with respect to all the objects in the object list 24 ("YES" in Step S25), re-arraying of all objects in the object list 24 is made according to the priority value q obtained with respect to the respective object (step S27). In this case, if new objects are registered in the object list 24 as the object group 42 of the third priority in the preceding step S23, then there is a possibility to cause excess of the total number of the objects to be held in the object list 24 (N1+N2+N3). In such a case, the objects of the corresponding number in the object group 42 of the third priority are discarded as the objects group 43 outside the subject of control (step S28). Thereafter, the process is returned to the foregoing step S13.

Due to the above processing carried out by the prediction part 21, the execution control part 22 previously starts the application program 26 with respect to each object of the first priority object group 40 in the object list 24 to make its contents possible to be displayed by the display/reproducing part 23, and likewise, with respect to each object in the second priority object group 41, the application program 26 is started to start its processing.

FIG. 10 is a schematic view to show the contents of the hyper text browsing program 20 which is the computer program recorded on the recording medium. As described above, the recording medium in which this hyper text browsing program 20 is recorded may be a flexible disk FD or a CD-ROM CD, or further an HDD 111 of personal computer 10, or a server 211 of the computer communication service provider 210, which may be in a condition executable by being loaded on the RAM 113 of a personal computer 10 at the time of the execution.

In this hyper text browsing program 20 recorded are:

"step of calculating the probability of the respective contents being designated based on the operation of the input device", "step of arraying the plural contents on the list in the order of the high probability of designation according to the results of calculation", "step of examining the operating condition of the input device", "step of obtaining the moving distance and the moving direction of the position designated by the input device based on the results of examination in the operating condition of the input device", "step of obtaining the position and the moving velocity of the position designated by the input device in the logical space", "step of re-calculating the probability of the respective contents being designated in case of a change in the position designated by the input device", "step of re-arraying the plural contents on the list in the order of the probability of designation according to the results of calculation", and "step of starting the application program for processing the respective one with respect to the predetermined number of contents arrayed on the top side of the list".

When such a flexible disk FD (or CD-ROM CD) is inserted in the FDD 15 (or CDD 17), the hyper text browsing program 20 as described above which is recorded therein is once stored in the HDD 111. And, in starting the hyper text browsing program 20, it is read out from the HDD 111 and stored in the RAM 113, and the control for browsing the hyper text as described above is carried out by the CPU 110.

In the foregoing embodiment, each content which is a hyper text is to be recorded in the CD-ROM CD. Needless to say, however, the present invention is also effective in the case where the personal computer 10 is connected with the electronic network and the contents existing on the Interned are to be browsed.

As described in detail above, according to the application program starting method, recording medium having the record of said computer program, and computer system of the present invention, the contents indication information, i.e., object, which is for indicating the contents according to the probability of being designated by the user next, is arrayed in the list in the storing means, and the corresponding application programs are started in said order in advance to carry out preparation for processing. Accordingly, when the user has actually designated the symbolic diagram image, more concretely the contents, it is directly processed to become available for utilization by the user.

Further, as the progress of the preparation for processing the contents by the application program is controlled to be different stepwise according to the probability of designation, the higher the probability of being designated by the user is, the more quickly it becomes possible to be used by the user.

Further, as the object to indicate the contents wherein the probability obtained as the calculation result has been lowered to the predetermined level or lower is deleted from the list, the hardware resource can be saved.

With respect to the information (contents) in which the existence position in the logical space is defined by the link relation with another piece of information, the above probability calculation is carried out on the basis of the position wherein the link is defined in the link source.

Furthermore, with respect to the distance between the designated position by the input device in the logical space and the logical position of the individual symbolic diagram image, and the symbolic diagram image whose existence position in the logical space is defined by the relation of link with other symbolic diagram image, the above probability is calculated according to the number of links from the symbolic diagram image of the link source, the angle between the moving direction of the position designated by the input device in the logical space and the direction to the logical position of the individual symbolic diagram image, and the moving velocity of the position designated by the input device in the logical space, respectively, and therefore it is possible to differentiate the calculation results of the probability according to necessity.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A method for starting an application program for outputting a piece of information disposed in a logical space when the piece of information is designated by an operation of an input device, the method comprising:

checking an operating condition of the input device, the operating condition indicating a position designated by the input device in the logical space;

calculating probabilities that respective pieces of information disposed in the logical space will be be designated in a next operation, the probabilities increasing with decreasing distance between the designated position and respective positions of the pieces of information and being calculated based on data indicating the designated position;

arraying a plurality of the pieces of information in descending order of probability according to the calculated probabilities; and starting an application program in advance of the next operation by the input device, the started application program for processing a piece of information for which the corresponding probability is included in a predetermined number of highest probabilities in the probability order.

2. The application program starting method as set forth in claim 1, wherein, in said step of carrying out the preparation for processing, series of information arrayed in the order of the probability are divided into plural groups according to the probability level, and the progress of preparation for the application programs for processing the information of the respective groups are differentiated by group.

3. The application program starting method as set forth in claim 1, wherein the information in which the probability obtained as the calculation results by said step of calculating the probability is not lower than the predetermined level is arrayed in a list form as the information for processing preparation information to be stored, and the information in which the calculated probability has become the predetermined level or lower is deleted from said list.

4. The application program starting method as set forth in claim 1, wherein, in said step for calculating the probability, with respect to the information whose existence position in the logical space is defined by a link relation with the another information, the calculation of the probability is carried out on the basis of the position on which the link is defined in the information of the link source.

5. The application program starting method as set forth in claim 1, wherein, in said step for calculating a probability, calculation is made so that:

the probability becomes higher as the distance between the position designated by said input device in said logical space and the logical position of the individual information decreases;

with respect to the information whose existence position in said logical space is defined by the link relation with another piece of information, the probability becomes the lower as the number of links from the information of the link source increases;

the probability becomes the higher as the angle between the moving direction of the position designated by said input device in the logical space and the logical position of the individual information decreases; and the probability becomes higher even when the angles are the same, as the moving velocity of the position designated by said input device in said logical space increases, respectively.

6. A computer system for displaying on a display symbolic diagram images respectively representing information contents, and for displaying on the display information contents corresponding to a designated one of the symbolic diagram images, said computer system comprising:

probability calculating means for calculating probabilities that respective ones of the symbolic diagram images will be designated by an operation of an input device, the probabilities increasing with decreasing distance between a position designated by the pointing device and respective positions of the symbolic diagram images and based on data indicating the position designated by the input device;

storing means for storing contents designation information designating the information contents respectively represented by the symbolic diagram images, the contents designation information being stored in descending order of probability according to the calculated probabilities for the respective symbolic diagram images;

controlling means for starting an application program for processing specified contents designation information designating information contents represented by a symbolic diagram image having one of a predetermined number of highest probabilities according to the probability order; and means for preparing to process, by the application program started by said controlling means, the information contents designated by the specified contents designation information.

7. The computer system as set forth in claim 6, wherein said means for carrying out the preparation for processing divides the plural pieces of the contents designation information into the plural groups according to the level of the probability order and controls so that the progress of the preparation for processing the contents designated by the contents designation information of the respective groups by the application program are to be differentiated.

8. The computer system as set forth in claim 6, wherein said storing means deletes the contents designation information corresponding to the symbolic diagram images in which the probability obtained as the results of calculation by said probability calculating means has been lowered to the predetermined level or lower.

9. A computer readable recording medium having encoded thereon computer readable program code means for starting an application program for processing information contents corresponding to a symbolic diagram image included among symbolic diagram images displayed on a display of a computer and respectively representing information contents dispersed in a logical space, each information contents having at least a partial link relation, said computer readable program code means comprising:

code means for causing said computer to determine an operating condition of an input device;

code means for causing the computer to calculate probabilities that respective ones of the symbolic diagram images will be designated by an operation of the input device, the probabilities being calculated based on the operating condition of the input device;

code means for causing the computer to array contents designation information corresponding to a set of the information contents in descending order of the calculated probabilities therefor, the contents designation information associating the corresponding information contents with corresponding ones of the symbolic diagram images;

code means for causing the computer to obtain first data indicating a moving distance and a moving direction of a position designated by the input device based on the operating condition of the input device;

code means for causing the computer to obtain second data indicating a position designated by the input device and a moving velocity thereof in the logical space;

code means for causing the computer to re-calculate the probabilities that the respective ones of the symbolic diagram images will be designated when third data indicates that the position designated by the input device has changed;

code means for causing the computer to re-array the contents designation information corresponding to the set of information contents in descending order of the re-calculated probabilities therefor; and code means for causing the computer to prepare the processing by starting an application program for processing contents designation information corresponding to information contents having a probability included among a predetermined number of highest probabilities according to the probability order.

10. The computer readable recording medium as set forth in claim 9, wherein, in said computer readable program code means for causing said computer to prepare the processing, a plurality of contents designation information contained in the list are divided into a plurality of groups according to the level of the probability, thereby accelerating the degree of progress of preparation for processing by the application program designation information in the group having high level of probability.

11. A method for starting an application program for outputting a piece of information disposed in a logical space when the piece of information is designated by an operation of an input device, the method comprising:

checking an operating condition of the input device, the operating condition indicating a position designated by the input device in the logical space;

calculating probabilities that respective ones of pieces of information disposed in the logical space will be designated in a next operation, the probabilities being based on the designated position and increasing with decreasing angular separation between a moving direction of the designated position and directions from the designated position to respective positions of the pieces of information in the logical space;

arraying a plurality of the pieces of information in descending order of probability according to the calculated probabilities; and starting an application program in advance of the next operation by the input device, the started application program for processing a piece of information for which the corresponding probability is included in a predetermined number of highest probabilities in the probability order.

12. A method for starting an application program for outputting a piece of information disposed in a logical space when the piece of information is designated by an operation of an input device, the method comprising:

checking an operating condition of the input device, the operating condition indicating a position designated by the input device in the logical space;

calculating probabilities that respective ones of pieces of information disposed in the logical space will be designated in a next operation of the input device, the probabilities being based on the designated position and increasing with increasing moving velocity of the designated position when a moving direction of the designated position and directions from the designated position to respective positions of the pieces of information in the logical space coincide;

arraying a plurality of the pieces of information in descending order of probability according to the calculated probabilities; and starting an application program in advance of the next operation by the input device, the started application program for processing a piece of information for which the corresponding probability is included in a predetermined number of highest probabilities in the probability order.

13. A method for starting an application program for outputting a piece of information disposed in a logical space when the piece of information is designated by an operation of an input device, the method comprising:

checking an operating condition of the input device, the operating condition indicating a position designated by the input device in the logical space;

calculating probabilities that respective ones of pieces of information disposed in the logical space will be designated in a next operation of the input device, the probabilities being based on the designated position and decreasing with increasing numbers of links from reference piece of information to the respective pieces of information;

arraying a plurality of the pieces of information in descending order of probability according to the calculated probabilities; and starting an application program in advance of the next operation by the input device, the started application program for processing a piece of information for which the corresponding probability is included in a predetermined number of highest probabilities in the probability order.

14. A computer system for displaying on a display symbolic diagram images respectively representing information contents, and for displaying on the display information contents corresponding to a designated one of the symbolic diagram images, said computer system comprising:

probability calculating means for calculating probabilities that respective ones of the symbolic diagram images will be designated by an operation of an input device, the probabilities being based on a position designated by the input device and increasing with decreasing angular separation between a moving direction of the designated position and directions from the designated position to respective positions of the pieces of information in the logical space;

storing means for storing contents designation information designating the information contents respectively represented by the symbolic diagram images, the contents designation information being stored in descending order of probability according to the calculated probabilities for the respective symbolic diagram images;

controlling means for starting an application program for processing specified contents designation information designating information contents represented by a symbolic diagram image having one of a predetermined number of highest probabilities according to the probability order; and means for preparing to process, by the application program started by said controlling means, the information contents designated by the specified contents designation information.

15. A computer system for displaying on a display symbolic diagram images respectively representing information contents, and for displaying on the display information contents corresponding to a designated one of the symbolic diagram images, said computer system comprising:

- probability calculating means for calculating probabilities that respective ones of the symbolic diagram images will be designated by an operation of an input device, the probabilities being based on a position designated by the input device and increasing with decreasing distance between a position designated by the pointing device and respective positions of the symbolic diagram images and based on data indicating the position designated by the input device;
- storing means for storing contents designation information designating the information contents respectively represented by the symbolic diagram images, the contents designation information being stored in descending order of probability according to the calculated probabilities for the respective symbolic diagram images;
- controlling means for starting an application program for processing specified contents designation information designating information contents represented by a symbolic diagram image having one of a predetermined number of highest probabilities according to the probability order; and
- means for preparing to process, by the application program started by said controlling means, the information contents designated by the specified contents designation information.

16. A computer system for displaying on a display symbolic diagram images respectively representing information contents, and for displaying on the display information contents corresponding to a designated one of the symbolic diagram images, said computer system comprising:

- probability calculating means for calculating probabilities that respective ones of the symbolic diagram images will be designated by an operation of an input device, the probabilities being based on a position designated by an input device and increasing with decreasing distance between a position designated by the pointing device and respective positions of the symbolic diagram images and based on data indicating the position designated by the input device;
- storing means for storing contents designation information designating the information contents respectively represented by the symbolic diagram images, the contents designation information being stored in descending order of probability according to the calculated probabilities for the respective symbolic diagram images;
- controlling means for starting an application program for processing specified contents designation information designating information contents represented by a symbolic diagram image having one of a predetermined number of highest probabilities according to the probability order; and
- means for preparing to process, by the application program started by said controlling means, the information contents designated by the specified contents designation information.

17. A method for starting a data output process in advance of a user's designation of data to be output, the method comprising:

- calculating a probability that the user's operation with the input device will designate a corresponding piece of information as the data to be output, the probability being based on at least one of a position, a moving direction, and a moving velocity indicated by data from the input device at a time in advance of the operation; and
- determining whether to start an outputting process for the piece of information in advance of the operation based on the probability.

18. The method as set forth in claim 17, wherein the data from the input device indicates at least one of a designated position, a moving direction, and a moving velocity in a logical space at the time in advance of the operation, the piece of information being disposed at a predetermined position in the logical space.

19. The method as set forth in claim 17, wherein the data from the input device represents at least one of the position, the moving direction, and the moving velocity of the input device at the time in advance of the operation.

20. A computer system for displaying data designated by a user's operation of an input device, said computer system comprising:

- a storage storing a plurality of pieces of information; and
- a processor calculating a probability at a current time that the user's operation of the input device at a later time will designate a corresponding piece of the plurality of pieces of information and determining, based on the probability, whether to start an outputting process for the piece of information in advance of the user's operation, the probability being based on at least one of a position, a moving direction, and a moving velocity indicated by data from the input device at the current time.

21. A computer readable medium encoded with program instructions for starting a data output process in advance of a user's operation of an input device to designate data to be output, said program instructions comprising instructions for: calculating a probability that the user's operation with the input device will designate a corresponding piece of information as the data to be output, the probability being based on at least one of a position, a moving direction, and a moving velocity indicated by data from the input device at a time in advance of the operation; and

- determining whether to start an outputting process for the piece of information in advance of the operation based on the probability.

* * * * *

UNITED STATES PATENT AND TRADEMARK OFFICE
CERTIFICATE OF CORRECTION

PATENT NO.:     6,049,795
DATED      :    April 11, 2000
INVENTOR(S):    Toru KAMIWADA, et al.

It is certified that errors appear in the above-identified patent and that said Letters Patent is hereby corrected as shown below:

Col. 16, line 24, after "from" insert --a--.

Col. 18, line 49, after "for" insert a return for a new paragraph.

Signed and Sealed this

Tenth Day of April, 2001

Attest:

NICHOLAS P. GODICI

Attesting Officer    Acting Director of the United States Patent and Trademark Office